United States Patent [19]

Robertson et al.

[11] Patent Number: 4,867,248

[45] Date of Patent: Sep. 19, 1989

[54] SHANK MOUNTING ASSEMBLY FOR SOIL OPENING POINT

[75] Inventors: Forrest E. Robertson; Donald E. Williams, both of Garden City, Kans.

[73] Assignee: Acra-Plant, Inc., Garden City, Kans.

[21] Appl. No.: 72,546

[22] Filed: Jul. 13, 1987

[51] Int. Cl.[4] ..................... A01B 15/00; A01B 71/08
[52] U.S. Cl. .................... 172/753; 172/721; 172/744; 403/255
[58] Field of Search ............. 111/7; 172/708, 713, 172/719, 721, 724, 730, 732, 742, 744, 753, 762, 770, 751; 403/254, 255, 337, 353

[56] References Cited

U.S. PATENT DOCUMENTS

| | | | |
|---|---|---|---|
| 430,166 | 6/1890 | Bauman | 172/724 |
| 1,328,740 | 1/1920 | Huggins | 172/730 |
| 1,499,531 | 7/1924 | Hoeregott | 172/730 |
| 1,595,112 | 8/1926 | Mentzer | 172/753 |
| 2,908,340 | 10/1959 | Love et al. | 172/730 X |
| 3,120,873 | 2/1964 | Bledsoe | 172/753 X |
| 4,441,266 | 4/1984 | Westimayer | 172/744 X |
| 4,446,927 | 5/1984 | Robertson | 172/719 X |
| 4,475,601 | 10/1984 | Harden et al. | 172/742 X |

FOREIGN PATENT DOCUMENTS

| | | | |
|---|---|---|---|
| 470673 | 1/1929 | Fed. Rep. of Germany | 172/721 |
| 2260914 | 6/1974 | Fed. Rep. of Germany | 403/337 |

*Primary Examiner*—Richard T. Stouffer
*Attorney, Agent, or Firm*—Hovey, Williams, Timmons & Collins

[57] ABSTRACT

A shank mounting assembly for a soil opening point permits adjustment of the spacing between a pair of mounting bolts of the assembly for permitting attachment of the assembly to farm implement shanks having bolt holes of various spacings. The assembly includes an elongated adapter having a hidden, internal cavity to which access is gained only by an elongated slot on the backside of the adapter. The cavity and slot are so dimensioned that while the bolts may move lengthwise within the slot for positioning adjustment, the enlarged heads of the bolts remain in the cavity and cannot pass through the slot. By having the cavity accessible only from the back of the adapter and by providing the front face of the adapter with a smooth, continuous, soil-engaging surface, the heads of the bolts are protectively unexposed to abrasive contact with the soil during use.

11 Claims, 1 Drawing Sheet

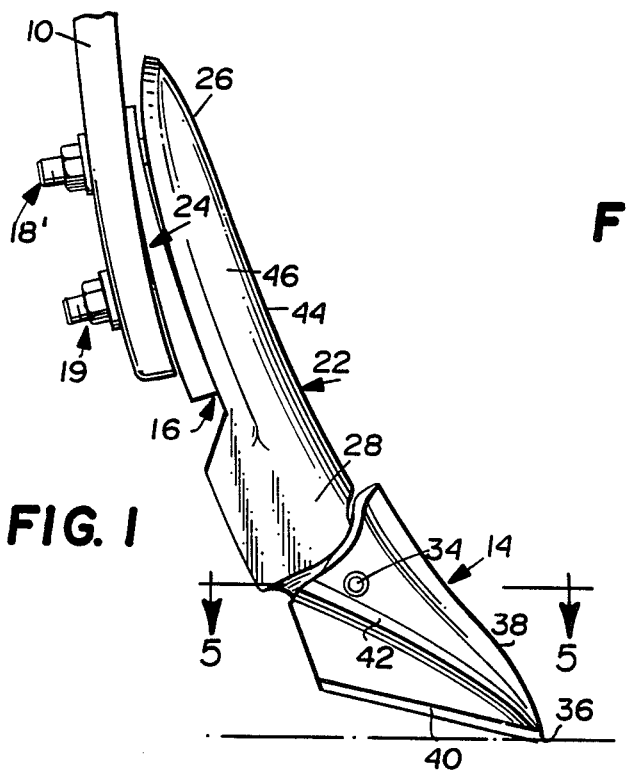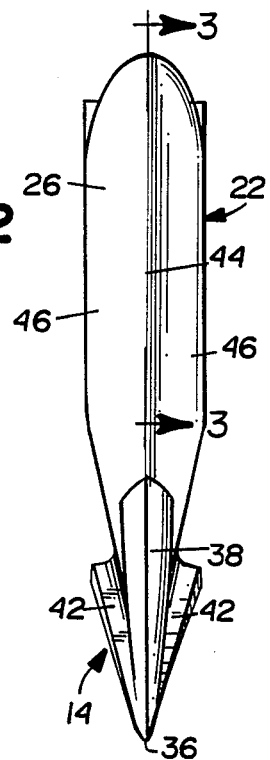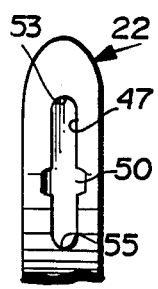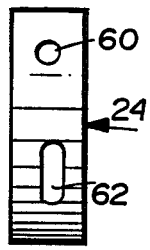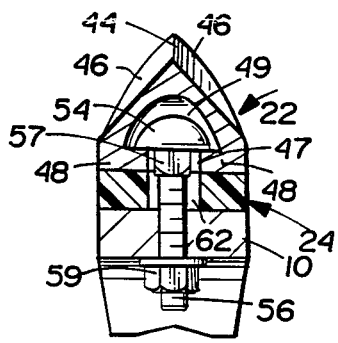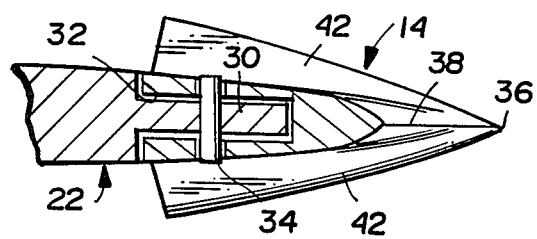

SHANK MOUNTING ASSEMBLY FOR SOIL OPENING POINT

FIELD OF THE INVENTION

This invention relates to the field of ground penetrating tools for farm implement shanks, and, more particularly, to a shank mounting assembly for soil opening points which is able to accommodate a variety of shanks having various bolt hole spacings without exposing the bolt heads to ground abrasion as the point is being drawn forwardly through the ground by the implement.

BACKGROUND ART

It is known in the art to use an elongated adapter to attach a ground penetrating point to a shank of a farm implement. One end of the adapter slips into a socket of the point and is pinned at that location, while the upper, opposite end of the adapter is bolted to the shank at a pair of longitudinally spaced locations. Nuts are threaded onto the ends of the bolts to tightly couple the adapter with the shank. Typically, because different manufacturers provide different bolt spacings on their shanks, a number of different adapters are provided, each having a bolt hole spacing matching a certain spacing on a particular manufacturer's shank. Furthermore, the heads of the bolts on prior adapters are located at the leading, soil-engaging faces of the adapters so as to be exposed to the abrasive action of the soil at that location, leading to premature wear.

Prior adapters could be quite easily and securely fastened to shanks having the corresponding bolt hole spacings. Furthermore, the exposed bolt heads of the prior adapters provided for easy insertion and removal of the bolts from the adapters.

However, the prior adapters also possess a number of problems or shortcomings. For example, the fixed spacing between the attachment bolts prevents attachment of the adapters onto shanks having bolt hole spacings differing from the adapter, and, therefore, limit use of the adapter to only a certain number of farm implements and their shanks. Furthermore, the exposed bolt heads of prior adapters experience substantial wear, due to ground abrasion as the point is drawn forwardly through the ground by the farm implement, thereby risking premature failure of the bolts and uncoupling of the adapter from the shank.

Consequently, a need exists for improvements in shank mounting assemblies for soil opening points which will permit mounting of the adapters onto shanks having various bolt hole spacings and which will protect the bolt heads from ground abrasion as the point is drawn forwardly through the ground by the implement.

SUMMARY OF THE INVENTION

Accordingly, one important object of the present invention is to provide a shank mounting assembly for a ground opening point wherein the mounting assembly is readily adaptable for mounting onto a wide variety of shanks having different bolt hole spacings, but where the heads of the mounting bolts are protectively shielded from abrasive action of the soil so as to significantly prolong the useful life of the bolts. Pursuant to the foregoing, the present invention contemplates a mounting assembly in which the adapter between the point and the shank is provided with a hidden, bolt head retaining cavity on the backside thereof which is only accessible through a special elongated slot arrangement on the backside of the adapter. The front face of the adapter is thus entirely closed in the sense that no bolt holes are presented by which abrasive soil can gain access to the bolt heads. The slot is so designed that an enlarged entry opening is presented at essentially midlength of the slot through which the bolt heads can be initially manipulated, but once installed, the heads cannot slip through other portions of the slot due to its narrow width relative to the heads. By manipulating the bolts upwardly or downwardly along the slot, an appropriate position can be obtained for the bolts corresponding to the particular bolt hole spacing encountered on the shank at hand.

BRIEF DESCRIPTION OF THE DRAWINGS

FIG. 1 is a side elevational view of a soil opening point attached to a farm equipment shank by a mounting assembly constructed in accordance with the principles of the present invention;

FIG. 2 is front elevational view thereof;

FIG. 3 is an enlarged, fragmentary, vertical cross-sectional view of the mounting assembly and shank taken substantially along line 3—3 of FIG. 2;

FIG. 4 is an enlarged cross-sectional view of the mounting assembly and shank taken substantially along 4—4 of FIG. 3;

FIG. 5 is an enlarged, fragmentary, horizontal cross-sectional view of the mounting assembly and point taken substantially along line 5—5 of FIG. 1;

FIG. 6 is a rear, fragmentary, elevational view of the adapter; and

FIG. 7 is a front elevational view of a shim forming a part of the mounting assembly.

DETAILED DESCRIPTION

An elongated, downwardly and forwardly extending shank 10 for a farm implement (not shown) has a pair of longitudinally spaced apart, fore-and-aft extending bolt holes 12 (FIG. 3). A ground penetrating point 14 is secured to shank 10 by a mounting assembly 16 which includes a pair of longitudinally spaced apart bolts 18 and 19, an elongated adapter 22 and a wedge shaped shim 24.

The adapter 22 has an upper portion 26 and a lower portion 28. The shim 24 is located between an upper mount portion 26 and the shank 10 for reducing wear therebetween and for permitting slight variation in the angle of attack of the point 14, depending upon whether the shim is in the position illustrated in FIGS. 1 and 3 with the tapered end projecting upwardly or is inverted with the tapered end pointing downwardly (not shown). As illustrated in FIG. 5, the lower portion 28 includes a forwardly extending tongue 30 which is received by a rearwardly open socket 32 of the point 14. A pin 34 extends transversely through the tongue 30 and the point 14, providing coupling therebetween.

The point 14 includes a forwardmost ground penetrating tip 36, an upper slicing edge 38 extending upwardly and rearwardly from the tip 36, a lower creasing edge 40 extending upwardly and rearwardly from the tip 36, and a pair of laterally outwardly projecting, rearwardly diverging wings 42 extending upwardly and rearwardly from the tip 36.

The adapter 22 is generally transversely convex, having a closed front face that is provided with an upwardly and rearwardly extending leading edge 44 and a pair of sidewalls 46 which diverge rearwardly therefrom. While the adapter 22 is itself generally transversely convex, the leading edge 44 thereof is slightly concavely configured when viewed in side elevation, as shown, for example in FIG. 1.

The backside of the adapter 22 is provided adjacent the upper end thereof with an elongated, centrally disposed slot 47 which opens into an internal cavity 49 slightly longer and wider than slot 47. Because the cavity 49 is wider than the slot 47, a pair of elongated shoulders 48 (FIG. 4) are defined on opposite sides of the slot 47 which extend along the full length of the slot 47 except at the midpoint thereof where an enlarged entry opening 50 is located. Slot 47 is narrower than the heads 54 of bolts 18,19, but is somewhat wider than the shafts 56 thereof. On the other hand, the opening 50 has a transverse width which is slightly greater than the corresponding width of the bolt heads 54 and has a dimension in the longitudinal direction of slot 47 which exceeds the radius of the bolt heads 54 such that bolt heads 54 may be inserted into and removed from the cavity 49 in the manner described below.

The upper end of the slot 47 defines an upper abutment 53 for the bolt 18 to limit downward movement of the adapter 22 relative to the shank 10. On the other hand, the lower end of the slot 47 defines a lower abutment 55 for the bolt 19 to limit upward movement of the adapter 22 relative to the shank 10. Adjacent the bolt heads 54, the shafts 56 include sections 57 of square cross section which prevent rotation of the shafts 56 within slot 47. The outer ends of the shafts 56 are circular in cross section and are threaded for receiving nuts 59.

The elongated shim 24 includes a pair of longitudinally spaced apart apertures 60,62. The width of the apertures 60,62 is greater than that of the shafts 56 so as to permit insertion of the shafts 56 therethrough. Lower aperture 62 is elongated for permitting longitudinal adjusting movement of lower bolt 19 therein.

OPERATION

Initially, the point 14 is attached to the lower portion 28 of the adapter 22. Then, the bolts 18 and 19 are assembled to the adapter 22 by inserting the bolt heads 54 sideways into and through the opening 50 until heads 54 are fully received within cavity 49 and shafts 56 are projecting outwardly through slot 47. In that condition, although the bolts 18 and 19 can slide longitudinally within the cavity 49 along the slot 47, the reduced width of the slot 47 relative to the cavity 49 will cause the shoulders 48 to retain the bolts 18,19 against disassembly from the adapter 22.

The shim 24 may then be applied to the adapter 22 by simply aligning the bolts 18,19 with apertures 60,62 of shim 24 and pushing the shim 24 onto bolts 18,19. By then shifting the bolts 18,19 longitudinally of the slot 47 until their spacing corresponds to that of the bolt holes 12 on shank 10, the adapter 22, bolts 18,19 and shim 24 are ready to be attached to the shank 10. Insertion of the bolts 18,19 into bolt holes 12, addition of the nuts 59 onto bolts 18,19, and tightening down of the nuts 59 causes the adapter 22 to be drawn tightly against shim 24 and shank 10 to complete the installation procedure.

The equipment is then drawn forwardly through the ground by the farm implement, wherein point 14 and the adapter 22 penetrate and divide the soil. The soil which engages the upper portion 26 of the adapter 22 is divided by the leading edge 44 and flows on around the convex contours of the adapter 22. Because the bolt heads 54 are protectively ensconced within the interior cavity 49, the abrasive soil never engages heads 54 to cause deleterious, premature wear of those components, thus prolonging the overall life of the tool and improving its utility.

It has been found when using the hidden bolt-mounting concepts of the present invention that a pair of bolts is preferable over using a single bolt since otherwise the adapter 22 tends to move relative to the single bolt and can be worked completely loose when the bolt head is finally aligned with the central opening 58. However, when a pair of spaced apart bolts are used in the above described manner, neither bolt 18,19 can work its way to the opening 58 because abutments 53,55 prevent sufficient upward or downward movement of the adapter 22 as to bring the opening 58 into alignment with either of the bolt heads 54. Thus, the farmer is assured that the point 14 will remain securely fastened in the intended manner to the shank 10 throughout even the most aggressive soil working operations.

We claim:

1. A ground penetrating tool for being drawn forwardly through the ground by a farm implement including an elongated, downwardly and forwardly extending shank having a pair of longitudinally spaced apart bolt holes, said tool comprising:

an elongated, downwardly and forwardly extending adapter having an upper portion and a lower portion;

a ground penetrating point attached to said lower portion of the adapter; and upper and lower longitudinally spaced bolts extending rearwardly from the upper portion of said adapter for coupling the adapter with said shank, said upper portion including upper abutment means for limiting downward movement of the adapter relative to the upper bolt, and lower abutment means for limiting upward movement of the adapter relative to the lower bolt, at least one of said bolts being slidably coupled with said adapter for permitting adjustment of the longitudinal spacing between said bolts and consequent axial alignment with said holes of the shank.

2. A ground penetrating tool as claimed in claim 1, wherein each of said bolts includes an enlarged head and a shank, said adapter being provided with an internal cavity in the backside thereof receiving said heads and with an elongated, rearwardly exposed access slot communicating with said cavity, said slot being of reduced width compared to the cavity to clear the shanks of the bolts but retain the heads thereof in the cavity during adjustable sliding of the shanks within the slot.

3. A ground penetrating tool as claimed in claim 2, wherein said slot is provided with an enlarged entry opening therein between opposite ends of the slot for passage of the bolt heads therethrough during installation and removal of the bolts from the cavity.

4. A ground penetrating tool as claimed in claim 1, wherein both of said bolts are slidably coupled with said adapter.

5. A ground penetrating tool as claimed in claim 1, further comprising:

an elongated, wedge-shaped shim having a pair of longitudinally spaced apart apertures receiving said bolts, one of said apertures being elongated for permitting adjustment of the longitudinal spacing between said bolts for permitting axial alignment of said pair of bolts with said pair of bolt holes.

6. A mounting assembly for attaching a ground penetrating point to a farm implement including an elongated depending shank having a pair of longitudinally spaced apart bolt holes, said mounting assembly comprising:

an elongated adapter;

means adjacent one end of said adapter for mounting a ground penetrating point thereon; and first and second bolts coupled with and extending outwardly from said adapter, said bolts being spaced apart longitudinally along said adapter and at least one of said bolts being slidably coupled with said adapter for permitting movement of said bolt longitudinally along said adapter for adjusting said longitudinal spacing between said bolts and permitting axial alignment of said bolts with said bolt holes for insertion therein, said adapter including first abutment means for limiting longitudinal movement of the adapter relative to the first bolt in a first longitudinal direction of the adapter, and second abutment means for limiting longitudinal movement of the adapter relative to the second bolt in a second longitudinal direction of the adapter which is opposite to the first longitudinal direction.

7. A mounting assembly as claimed in claim 6, wherein each of said bolts includes an enlarged head and a shank, said adapter being provided with an internal cavity in the backside thereof receiving said heads and with an elongated, rearwardly exposed access slot communicating with said cavity, said slot being of reduced width compared to the cavity to clear the shanks of the bolts but retain the heads thereof in the cavity during adjustable sliding of the shanks within the slot.

8. A mounting assembly as claimed in claim 7, wherein said slot is provided with an enlarged entry opening therein between opposite ends of the slot for passage of the bolt heads therethrough through during installation and removal of the bolts from the cavity.

9. A mounting assembly as claimed in claim 6, wherein both of said bolts are slidably coupled with said adapter.

10. A mounting assembly as claimed in claim 6, further comprising:

an elongated, wedge-shaped shim, said shim having a pair of longitudinally spaced apart apertures for receiving said shafts, one of said apertures being elongated for permitting adjustment of the longitudinal spacing between said bolts for permitting axial alignment of said bolts with said bolt holes.

11. A mounting assembly for attaching a ground penetrating point to a farm implement having an elongated depending shank with a pair of longitudinally spaced apart bolt holes, the mounting assembly comprising:

an elongated adapter having a first end and a second end, and including an internal cavity therein adjacent the first end;

means for mounting a ground penetrating point on said adapter; and a pair of longitudinally spaced bolts having bolt heads and extending rearwardly from the first end of the adapter for coupling the adapter with the shank, the cavity being completely enclosed with the bolt heads encased therein when the assembly is mounted on the shank.

* * * * *